United States Patent
Chae

(10) Patent No.: US 9,164,612 B2
(45) Date of Patent: Oct. 20, 2015

(54) FLEXIBLE TOUCH DISPLAY PANEL

(71) Applicant: Samsung Display Co., Ltd., Yongin, Gyeonggi-Do (KR)

(72) Inventor: Byung-Hoon Chae, Yongin (KR)

(73) Assignee: Samsung Display Co., Ltd. (KR)

( * ) Notice: Subject to any disclaimer, the term of this patent is extended or adjusted under 35 U.S.C. 154(b) by 155 days.

(21) Appl. No.: 14/103,409

(22) Filed: Dec. 11, 2013

(65) Prior Publication Data

US 2015/0042598 A1   Feb. 12, 2015

(30) Foreign Application Priority Data

Aug. 6, 2013  (KR) .......................... 10-2013-0093335

(51) Int. Cl.
*G06F 3/045*   (2006.01)
*G06F 3/041*   (2006.01)

(52) U.S. Cl.
CPC ...................................... *G06F 3/041* (2013.01)

(58) Field of Classification Search
None
See application file for complete search history.

(56) References Cited

U.S. PATENT DOCUMENTS

2012/0127095 A1   5/2012  Jun

FOREIGN PATENT DOCUMENTS

| KR | 1020110102996 A | 9/2011 |
| KR | 10-2012-0055235 | 5/2012 |
| KR | 1020120074258 A | 7/2012 |

*Primary Examiner* — Nicholas Lee
(74) *Attorney, Agent, or Firm* — Innovation Counsel LLP

(57) ABSTRACT

The spread of nascent cracks through a flexible electrodes layer is blocked or impeded by patterning at least one of the electrodes to have crack-spread blocking boundaries and/or crack-spread impeding choke points, where the crack-spread blocking boundaries are placed to block linear growth of cracks and the crack-spread impeding choke points are placed and sized to serve as bottlenecks that impede linear growth of cracks through the corresponding electrode. Additionally, greater flexibility is provided by including a pattern of elongated strips of narrow width electrode material longitudinally extending in different directions, where the provided flexibility is greater than what it would be if a pattern of elongated narrow width electrode strips longitudinally extending in different directions was not provided. One example of crack-spread blocking boundaries and flexibility enhancing patterning is that of shaping each electrode to have serpentine fingers extending longitudinally in different directions. One example of crack-spread impeding choke points is that of shaping each electrode to have close but spaced apart openings for example in a grid pattern.

20 Claims, 7 Drawing Sheets

FLEXIBLE TOUCH DISPLAY PANEL

RELATED APPLICATION

This application claims the benefit of Korean Patent Application No. 10-2013-0093335, filed on Aug. 6, 2013, in the Korean Intellectual Property Office, the disclosure of which application is incorporated herein in its entirety by reference.

BACKGROUND

1. Field of Disclosure

The present disclosure of invention relates to a flexible touch display panel.

2. Description of Related Technology

Recently, bulky CRT type displays have been replaced with portable thin profile display panels such as thin flat or thin curved panel displays. Also, research into a technology for integrating a touch function into such thin display panels has been conducted. With the touch function integrated, the display panels can simultaneously serve as information output and information input devices, instead of merely information displaying devices. More specifically, when a user touches a surface of the touch-enabled display panel with a finger or pen, the touch and/or its location and/or its gesture is detected. One class of touch-enabled display panels has a capacitive touch panel monolithically integrated with the display panel.

Meanwhile, the utility of such thin and touch-enabled display panels is not restricted to rigid flat display panels, but rather can be expanded to include flexible display panels that are bendable in various directions. To integrate the touch function into the flexible display panel, it is desirable to develop a touch structure that will not be damaged even when the display panel is bent in various directions.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

The present disclosure of invention provides a flexible touch display panel including a flexible electrodes layer (part of a touch sensing unit) in which cracks are prevented or impeded from spreading despite the flexible display panel being bent many times and in random directions. Additionally, greater flexibility is provided by including a pattern of elongated strips of narrow width electrode material longitudinally extending in different directions, where the provided flexibility is greater than what it would be if a pattern of elongated narrow width electrode strips longitudinally extending in different directions was not provided.

Additional details will be set forth in the description which follows and, in part, will be apparent from the description, or may be learned by study and practice of the presented embodiments.

According to one embodiment in accordance with the present disclosure, a flexible touch display panel includes a display device including a substrate, a display unit formed on the substrate, and an encapsulation film formed on the display unit to encapsulate the display unit; and a touch film that is arranged on the display unit, including a plurality of first sensing electrodes that are arranged as rows extending in a first direction, and a plurality of second sensing electrodes that are formed on a same layer and arranged as internally interconnected columns, where the plurality of first sensing electrodes are electrically insulated from the plurality of second sensing electrodes, wherein each of the plurality of first sensing electrodes includes first electrode patterns that are each independently extending according to a certain first direction and arranged in parallel to one another; and first connecting patterns for connecting neighboring electrode patterns among the first electrode patterns, the first connecting patterns extending in one or more directions other than the first direction.

The plurality of second sensing electrodes may be arranged in a second direction that intersects the direction in which the plurality of first sensing electrodes is arranged.

The first electrode patterns and the first connecting patterns may form bent conductive fingers each having a serpentine shape. The serpentine shapes of the conductive electrode fingers help to prevent linear growth of linearly expanding but nascent cracks. Thus, small (e.g., microscopic) cracks formed due to concentration of stresses from bending of the flexible panel are prevented or impeded from growing into substantially larger cracks by way of linear crack extension. Additionally, greater flexibility is provided by including a pattern of elongated strips of narrow width electrode material longitudinally extending in different directions, where the provided flexibility is greater than what it would be if a pattern of elongated narrow width electrode strips longitudinally extending in different directions was not provided and instead the electrode material was wider and/or not longitudinally elongated in different directions.

The plurality of first sensing electrodes and the plurality of second sensing electrodes may be transparent electrodes.

The plurality of first sensing electrodes and the plurality of second sensing electrodes may include any one selected from the group consisting of indium tin oxide (ITO), indium zinc oxide (IZO), indium oxide (IO), Ga-doped oxide (GZO), zinc oxide (ZnO), Al-doped oxide (AZO), fluorine doped tin oxide (FTO), antimony doped tin oxide (ATO), and $In_2O_3$.

Each of the plurality of second sensing electrodes includes second electrode patterns that are each independently extending according to a certain second direction and arranged in parallel to one another; and second connecting patterns for connecting neighboring electrode patterns among the second electrode patterns.

The second electrode patterns may be extending according to a same direction as the first electrode patterns.

The second electrode patterns and the second connecting patterns may form a serpentine shape.

The touch film may further include an insulating layer formed on the plurality of first sensing electrodes and the plurality of second sensing electrodes, and the plurality of first sensing electrodes may be electrically interconnected by a first bridge electrode, and the plurality of second sensing electrodes may be electrically interconnected by a second bridge electrode that is arranged on the insulating layer.

The encapsulation film may be a thin encapsulation film in which an organic layer and an inorganic layer are alternately stacked.

According to another embodiment in accordance with the present disclosure of invention, a flexible touch display panel includes a display device including a substrate, a display unit formed on the substrate, and an encapsulation film formed on the display unit to encapsulate the display unit; and a touch film that is arranged on the display device, including a plurality of first sensing electrodes that are arranged in a first direction, and a plurality of second sensing electrodes that are formed on a same layer as the plurality of first sensing electrodes and electrically insulated from the plurality of first sensing electrodes, wherein each of the plurality of first sensing electrodes includes a plurality of first electrode patterns that are arranged in a grid shape and interconnected. The grid shape includes a plurality of crack-spread choke points or bottlenecks that impede the growth of linearly expanding cracks should any such cracks develop as nascent and microscopic cracks due to repeated bending of the flexible panel.

The plurality of second sensing electrodes may be arranged in a second direction that intersects the direction in which the plurality of first sensing electrodes is arranged.

The first electrode patterns may be interconnected, by first connecting patterns, with edges of neighboring electrode patterns that are among the first connecting patterns and connected to one another.

The plurality of first sensing electrodes and the plurality of second sensing electrodes may be transparent electrodes.

The plurality of first sensing electrodes and the plurality of second sensing electrodes may include any one selected from the group consisting of indium tin oxide (ITO), indium zinc oxide (IZO), indium oxide (IO), Ga-doped oxide (GZO), zinc oxide (ZnO), Al-doped oxide (AZO), fluorine doped tin oxide (FTO), antimony doped tin oxide (ATO), and $In_2O_3$.

Each of the plurality of second sensing electrodes may include a plurality of second electrode patterns that are arranged in a grid shape and interconnected.

The second electrode patterns may be interconnected, by second connecting patterns, with edges of neighboring electrode patterns that are among the second connecting patterns and connected to one another.

The touch film may further include an insulating layer formed on the plurality of first sensing electrodes and the plurality of second sensing electrodes, and the plurality of first sensing electrodes are electrically interconnected by a first bridge electrode, and the plurality of the second sensing electrodes are electrically interconnected by a second bridge electrode that is arranged on the insulating layer.

The encapsulation film may be a thin encapsulation film in which an organic layer and an inorganic layer are alternately stacked.

BRIEF DESCRIPTION OF THE DRAWINGS

These and/or other aspects will become apparent and more readily appreciated from the following description of here disclosed embodiments, taken in conjunction with the accompanying drawings in which.

DETAILED DESCRIPTION

Figure 1:
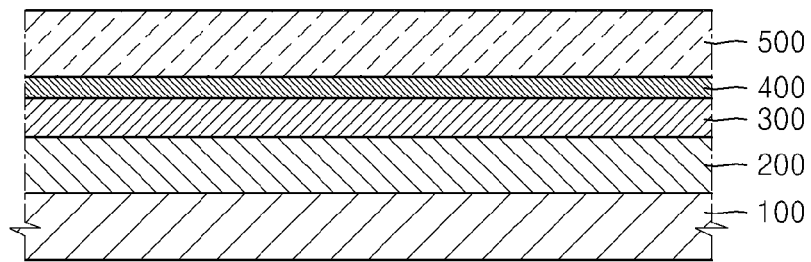
FIG. 1 is a cross-sectional view illustrating a flexible touch display panel according to an embodiment of the present disclosure of invention.

Reference will now be made in detail to embodiments, examples of which are illustrated in the accompanying drawings, wherein like reference numerals refer to the like elements throughout. In this regard, the present embodiments may take on different forms and should not be construed as being limited to the descriptions set forth herein. Accordingly, the embodiments are merely described below, by referring to the figures, to explain aspects of the present description. It will be understood that although the terms "first", "second", etc. may be used herein to describe various components, these components should not be limited by these terms. These components are only used to distinguish one component from another. As used herein, the singular forms "a," "an" and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components. Meanwhile, the term "/" used hereinafter may be interpreted as "and" and/or "or," depending on the context.

In the drawings, lengths and sizes of layers and regions may be exaggerated for clarity. It will be understood that when an element or layer is referred to as being "on" another element or layer, the element or layer can be directly on another element or layer or intervening elements or layers.

As used herein, the term "and/or" includes any and all combinations of one or more of the associated listed items. Expressions such as "at least one of," when preceding a list of elements, modify the entire list of elements and do not modify the individual elements of the list.

FIG. 1 is a cross-sectional view illustrating a flexible touch display panel according to an embodiment of the present disclosure of invention.

Referring to FIG. 1, the illustrated flexible touch display panel includes an image displaying device having a substrate 100, a display unit 200 disposed on the substrate, and an encapsulation film 300 disposed on the display unit; where the flexible touch display panel further includes a touch film 400; and a window 500. The flexible touch display panel may be referenced herein as flexible touch display panel 1234500.

The substrate 100 is a flexible substrate. The substrate 100 may be formed of a flexible plastic material. For example, the substrate 100 may be an organic material selected from the group consisting of electrically insulating organic materials including polyethersulphone (PES), polyacrylate (PAR), polyetherimide (PEI), polyethyelenen napthalate (PEN), polyethyeleneterepthalate (PET), polyphenylene sulfide (PPS), polyallylate, polyimide, polycarbonate (PC), triacetyl cellulose (TAC), and cellulose acetate propionate (CAP).

In case of an out-the-bottom emission-type display device in which an image is seen coming out from the substrate 100, the material(s) of the substrate 100 may be transparent material(s). However, in case of an out-the-top emission-type display device in which the image is seen coming as out from the encapsulation film 300, the substrate 100 may be formed of a metal having flexibility. When the substrate 100 is formed of a metal, the substrate 100 may include at least one selected from the group consisting of iron (Fe), chromium (Cr), manganese (Mn), nickel (Ni), titanium (Ti), molybdenum (Mo), stainless steel, invar alloy, inconel alloy, kovar alloy, and any mixtures thereof, but it is not limited thereto. The substrate 100 may be formed as a foil of one or more of these metals.

The display unit 200 is formed on the substrate 100, and is formed to output visible light. The display unit 200 may include various kinds of display devices, such as a liquid crystal device (LCD), an electro luminescent device (ELD), or an organic light-emitting diodes device (OLEDD). The display unit 200 includes a plurality of pixels. A structure of an exemplary display unit 200 will be described in detail later on, in reference to FIG. 2.

The encapsulation film 300 is arranged on the display unit 200. The encapsulation film 300 may face a surface of the display unit 200, and may be substantially parallel to the substrate 100, with the display unit 200 as the center. The encapsulation film 300 may be made of a flexible material that protects the display unit 200 from exposure to external moisture or oxygen.

For the encapsulation film 300, a thin encapsulation film 300 may be used in which an organic layer 310 (refer to FIG. 2) and an inorganic layer 320 (refer to FIG. 2) are stacked, to obtain the flexible touch display panel. The organic layer 310 may be used to help relieve internal stresses of the inorganic layer 320. An organic layer 310, formed as relatively thick, and an inorganic layer 320, formed as relatively thin, may be alternately stacked to thereby define a multilayered flexible and H2O/O2 impermeable encapsulation film 300. The organic layer 310 may include polymer-based materials, and the polymer-based materials may include acrylic resin, epoxy resin, polyimide, and polyethylene, etc. The inorganic layer 320 may be formed of at least one of a metal oxide, a metal nitride, metal carbides, and any mixtures thereof. For example, the inorganic layer 320 may include $AlO_x$, $TiO_2$, $ZrO$, $SiO_x$, $AlON$, $AlN$, $SiN_x$, $SiO_xN_y$, and an inorganic material, such as $InO_x$, and $YbO_x$.

The touch film 400 may be attached to a bottom one of the two major surfaces of the window 500, the bottom surface being arranged closer to the display unit 200. The window 500 is arranged in the path of light that is emitted from the form-the-top type display unit 200 of the display device, in order to protect the display device from an external source of pollution and/or scratching. Also, the touch film 400 attached to the bottom surface of the window 500 may be arranged in the path of light that is emitted from the display unit 200, that is, the touch film 400 may also be arranged on the display device.

The touch film 400 may be a capacitive type touch film including a plurality of conductive sensing electrodes. When an object having electrical capacitance like a user's finger/hand approaches or touches a surface of the flexible touch display panel and in accordance with the present disclosure of invention, the electrical capacitance of the user's finger/hand or other object perturbs an operation of circuitry that includes the touch film 400 such that the circuitry (not shown) detects the change of capacitance occurring due to the object approaching or touching the surface, and outputs data indicative of the location of the approaching or touching object. The touch film 400 is formed of a material that in addition to being electrically conductive, has high optical transparency, at least for transmission of light in the visible band (e.g., 380 nm-720 nm), that is, visible light that is emitted from the display device. A structure of the touch film 400 will be described in detail later on.

Figure 2:
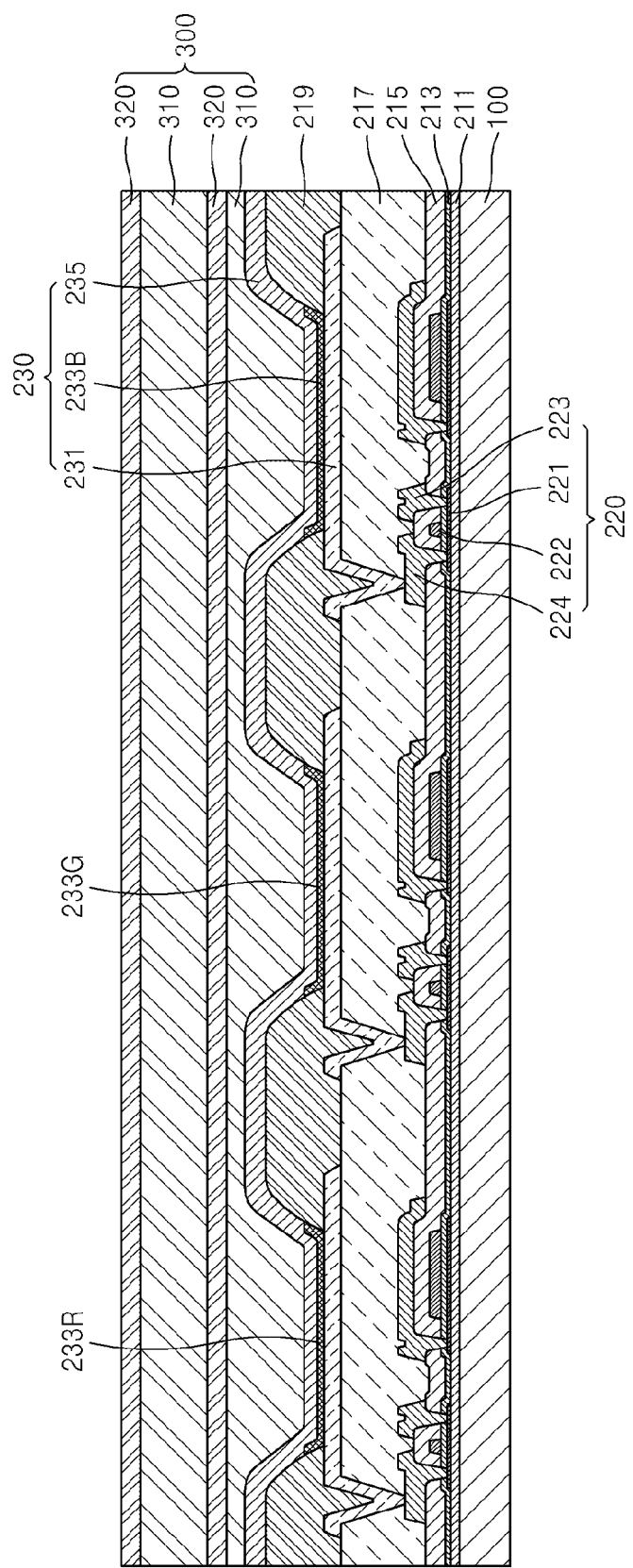
FIG. 2 is a cross-sectional view illustrating a display unit and an encapsulation film of FIG. 1.

FIG. 2 is a cross-sectional view illustrating an OLED type display unit 200 as an example and an encapsulation film 300 of FIG. 1.

Referring to FIG. 2, the display device includes the display unit 200 and the encapsulation film 300 that are formed on the substrate 100, and the display unit 200 includes a plurality of thin film transistors (TFTs) 220 and a plurality of OLEDs 230.

First, to form a smooth surface on an upper portion of the substrate 100 and prevent impurities from penetrating beyond the upper portion of the substrate 100, an impurities impermeable buffer layer 211 is formed on the upper portion of the substrate 100. The buffer layer 211 may be formed of $SiO_2$ and/or $SiNx$ and/or $SiOxNy$.

On the buffer layer 211, the TFTs 220 are formed. At least one TFT 220 is formed in each sub-pixel, and that one TFT 220 in each sub-pixel is electrically connected to the corresponding OLED 230 of the pixel and serves as part of a driving circuit that drives the OLED. The TFT 220 largely includes a semiconductive active layer 221, a gate electrode 222, a source electrode 223, and a driving (or drain) electrode 224.

On the buffer layer 211, the active layer 221 is formed having a predetermined pattern. The active layer 221 may be formed of an inorganic semiconductive material such as a semiconductive metal oxide or of a semiconductor material, such as amorphous silicon or polysilicon, or of an organic semiconductive material. The active layer 221 includes a source region, a drain region, and a channel region.

The source region and the drain region may be formed by doping impurities on the active layer 221 that is formed of amorphous silicon or polysilicon. A p-type semiconductor may be formed by doping, for example, with boron (B) impurities, and an n-type semiconductor may be formed by doping, for example, with nitrogen (N) impurities.

On an upper portion of the active layer 221, a gate insulating layer 213 is formed, and, in a predetermined region of an upper portion of the gate insulating layer 213, the gate electrode 222 is formed. The gate insulating layer 213 is formed to insulate the active layer 221 from the gate electrode 222, and may be formed of an organic material, or an inorganic material, such as SiNx, and SiO2.

The gate electrode 222 may be formed of a metal, such as Au, Ag, Cu, Ni, Pt, Pd, Al, and Mo, or a metal alloy, such as Al:Nd, and Mo:W. However, the gate electrode 222 is not limited thereto, and may be formed of various materials in consideration of closeness with adjacent layers, surface smoothness of stacked layers, electric resistance, and machinability. The gate electrode 222 is connected to a gate wire (not shown) for applying on/off signals to the TFT.

On an upper portion of the gate electrode 222, an interlayer insulating layer 215 including a contact hole is formed. Through the contact hole, the source electrode 223 and the drain electrode 224 are formed in such a way that the source electrode 223 and the drain electrode 224 are respectively adjacent to the source region and the drain region of the active layer 221. Materials used for forming the source electrode 223 and the drain electrode 224 may include an alloy composed of two or more metal elements, such as Al, Mo, Al:Nd, and MoW, as well as Au, Pd, Pt, Ni, Rh, Ru, Ir, and Os, but the alloy is not limited thereto.

The TFT 220 formed like this is protected by being covered by a passivation layer 217. The passivation layer 217 may be planarized at its top and may be formed of an inorganic insulating layer and/or an organic insulating layer. The inorganic insulating layer may include $SiO_2$, $SiNx$, $SiON$, $Al_2O_3$, $TiO_2$, $Ta_2O_5$, $HfO_2$, $ZrO_2$, BST, and PZT. The organic insulating layer may include a polymer, such as polymethylmethacrylate (PMMA), and polystyrene (PS); a polymer derivative having a phenol group; an acryl-based polymer; an imide-based polymer; an aryl ether-based polymer; an amide-based polymer; a fluorine-based polymer; a p-xylene-based polymer; a vinyl alcohol-based polymer; or any mixtures thereof. The passivation layer 217 may be formed as complex stacked layers of the inorganic insulating layer and the organic insulating layer.

A via-hole is formed on the passivation layer 217 to expose the drain electrode 224, and the OLED 230 is formed. The OLED 230 includes the first electrode 231, at least one of intermediate and respective color emitting layers 223R, 233G, and 233B, and the second electrode 235. Through the via-hole, the first electrode 231 and the second electrode 224 are electrically connected.

Then, a pixel-defining layer 219 is formed of an insulating material to cover the first electrode 231. Openings are formed in the pixel-defining layer 219 so as to expose respective ones of the first electrode 231 of the respective pixels. The respective one or more of the intermediate layers 233R, 233G, and 233B is/are formed on the exposed portion of the first electrode 231. Then, the second electrode 235 is formed of a transparent conductive material to cover the entire pixel. The first electrode 231 and the second electrode 235 may be an anode and a cathode, respectively. Alternatively, the first electrode 231 and the second electrode 235 may be a cathode and an anode, respectively.

For convenience of explanation, a structure of the intermediate layer 233R, 233G, and 233B, later to be described, will be restricted to the structure in which the first electrode 231 is an anode and the second electrode 235 is a cathode.

The intermediate layer 233R, 233G, and 233B includes an organic light-emission layer to emit visible light, and the organic light-emission layer may include a low molecular weight organic material or a high molecular weight organic material.

When the organic light-emission layer of the intermediate layer 233R, 233G, and 233B is formed of the low molecular weight organic material, a hole transport layer (HTL) and a hole injection layer (HIL) are stacked in a direction of the first electrode 231, with the organic light-emission layer as the center; and an electron transport layer (ETL) and an electron injection layer (EIL) are stacked in a direction of the second electrode 235. Various additional layers may be stacked according to design needs. Meanwhile, when the organic light-emission layer of the intermediate layer 233R, 233G, and 233B is formed of the high molecular weight organic material, only the HTL may be included in the direction of the first electrode 231, with the organic light-emission layer as the center.

Referring to FIG. 2, three respective sub-pixels are illustrated, and these sub-pixels respectively emit red, green, and blue visible lights. For this, the intermediate layer 233R includes an organic light-emission layer emitting red visible light, and the intermediate layer 233G includes an organic light-emission layer emitting green visible light, and the intermediate layer 233B includes an organic light-emission layer emitting blue visible light. FIG. 2 illustrates three sub-pixels respectively emitting red, green, and blue visible lights, but embodiments of in accordance with the present disclosure of invention are not limited thereto. According to another embodiment (not shown), the display unit 200 may include four sub-pixels emitting red, green, blue, and white visible lights, respectively. Yet alternatively the emitted lights may include cyan and/or magenta.

Meanwhile, the display unit described in reference to FIG. 2 is an OLED type, but the present disclosure of invention is not limited thereto. As described above, the display unit may be one of various forms of a display device, such as a liquid crystal device (LCD) and an electro-luminescent device (ELD).

Hereinafter, the touch film 400 described above will be described in detail, in reference to FIGS. 3 through 5.

Figure 3:
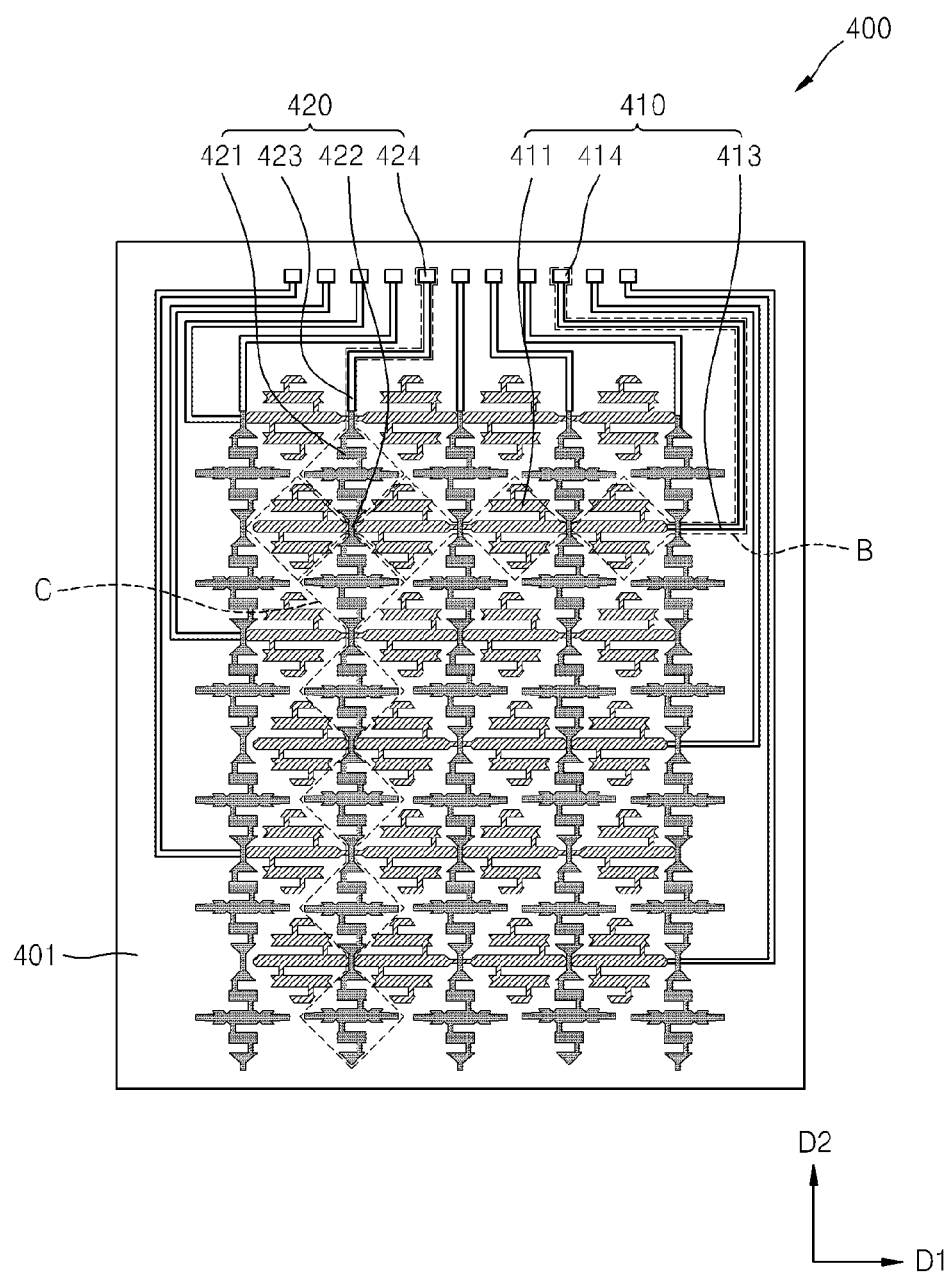
FIG. 3 is a plan view illustrating a touch film of FIG. 1.

FIG. 3 is a top plan view illustrating an exemplary touch film usable with the cross sectional structure of FIG. 1. FIG. 4 is an enlarged view of a representative region without FIG. 3. FIG. 5 is a perspective view illustrating capacitance-minimizing bridging structures used in an exemplary region of FIG. 3.

Referring to FIG. 3, the touch film 400 includes a base film 401, a plurality of first sensing units 410 disposed on the base film 401 and a plurality of second sensing units 420 that are also formed on the base film 401.

Referring to dotted line B of FIG. 3, this shows how at least one of the plurality of first sensing units 410 is arranged to extend longitudinally in the horizontal direction D1 of FIG. 3. The representative at least one (B) of the plurality of first sensing units 410 includes a plurality of first sensing electrodes 411, a plurality of first bridge electrodes 412 (see FIG. 5), a horizontal first extension unit 413, and a first connecting unit (e.g., pad) 414.

In other words, the plurality of first sensing units 410 are each arranged as a horizontally extending row that extend longitudinally along a first direction D1 as indicated in FIG. 3. The first sensing electrodes 411 are arranged as spaced apart one after the next in a row and along the first direction D1. Respective ones of the first bridge electrodes 412 interconnect neighboring ones of the spaced apart first sensing electrodes 411. The first extension unit 413 is formed as a horizontal extension extending out from an end boundary of the plurality of first sensing electrodes 411 and providing an electrical connection to a corresponding contact pad (first connecting unit) 414. More specifically, in the illustrated example, the first extension unit 413 extends first horizontally away from the matrix of first and second sensing units (410 and 420 respectively) and then bends according to a second direction D2, that is, a vertical direction of FIG. 3, so that each of the first extension units 413 may be formed to be gathered at one end of the base film 401, that is, an upper and outer side portion of FIG. 3. The first connecting unit 414 is formed as an enlarged contact pad area at an end of the first extension unit 413. The first connecting unit 414 may be formed to include a metal having a low resistance value, such as Mo.

Referring to dotted diamond area C of FIG. 3, this shows a representative at least one of the plurality of second sensing units 420 which are arranged spaced apart from one another along the vertical direction D2 of FIG. 3 to form columns. The representative at least one column of the plurality of second sensing units 420 includes a plurality of spaced apart second sensing electrodes 421, and interposed second bridge electrodes 422 disposed for interconnecting neighboring ones of the second sensing electrodes 421. The representative second sensing unit 420 further includes a second extension unit 423 extending vertically up and beyond the matrix of first and second sensing units (410 and 420) and a second connecting unit (e.g., contact pad) 424 formed at a terminal end of the second extension unit 423.

The plurality of columnar second sensing units 420 are arranged spaced apart from one another along the row direction D1 and each extending longitudinally along the second direction D2, that is, the vertical direction of FIG. 3. Accordingly, the spaced apart second sensing electrodes 421 of a given second sensing unit 420 are arranged as a vertical column according to the second direction D2. The plurality of second bridge electrodes 422 of the given second sensing unit 420 each interconnects its neighboring ones of the second sensing electrodes 421. The second extension unit 423 is formed as an extension from an end of the second sensing electrodes 421. For example, the second extension unit 423 extends according to the second direction, that is, the vertical direction of FIG. 3, so that each of the second extension units 423 may be formed to be gathered at the end of the base film 401, that is, the upper side of FIG. 3. At the end of the second extension unit 423 is formed the second connecting unit 424 and gathered within a middle portion of that upper side. The second connecting unit 424 may be formed to include a metal having a low resistance value, such as Mo.

As described above, the touch film 400 is arranged in a direction of visible light emission, that is, in a direction of the visible light emitted from the display device, and thus, the touch film 400 is formed of a material having high transparency for transmission of visible light. For example, the first sensing electrodes 411 and the second sensing electrodes 421 of the touch film 400 may include any one selected from the group consisting of indium tin oxide (ITO), indium zinc oxide (IZO), indium oxide (10), Ga-doped oxide (GZO), zinc oxide (ZnO), Al-doped oxide (AZO), fluorine doped tin oxide (FTO), antimony doped tin oxide (ATO), and $In_2O_3$.

In accordance with the present disclosure, in order to prevent or reduce the number of stress concentration points (and corresponding spreading of cracks) that may occur in the electrically conductive and light-passing material layers of the first and second sensing electrodes, 411 and 421, while allowing the flexible touch display panel to be bent in various directions, at least one of the first sensing electrodes 411 and the second sensing electrodes 421 is respectively formed to have turns (or other forms of crack spread barriers) in it that linearly expanding cracks cannot easily negotiate through as they try to grow into longer cracks. More specifically, the illustrated example has a serpentine shape that snakes about in the respective area of that sensing electrode. The serpentine shape may be one having a fractal distribution of alike and/or successively smaller sub-shapes (e.g., L-shapes; whereby growing cracks, if any, have to make numerous sharp turns within the serpentine shape in order to grow and spread). Additionally, greater flexibility is provided by including a pattern of elongated strips of narrow width electrode material longitudinally extending in different directions due to the serpentine nature of the pattern, where the provided flexibility is greater than what it would be if a pattern of elongated narrow width electrode strips longitudinally extending in different directions was not provided and instead the electrode material was wider and/or not longitudinally elongated in different directions.

Figure 4:
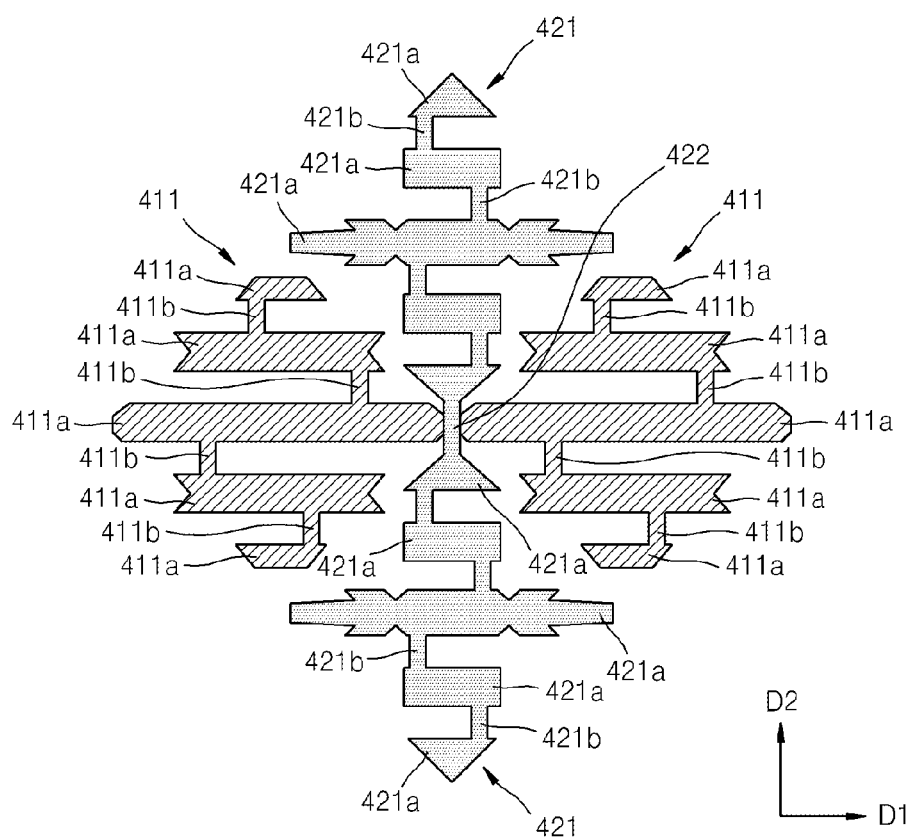
FIG. 4 is an enlarged view of a region of FIG. 3.

Referring to FIG. 4, the illustrated first sensing electrode 411 includes first electrode patterns 411*a* that are arranged in parallel to one another, and first connecting patterns 411*b* for interconnecting the first electrode patterns 411*a*. A combination of one horizontally extending first electrode pattern 411*a* and its immediately branching therefrom vertical first connecting pattern 411*b* may be considered as a repeated L-shape, where as can be seen in FIG. 4, there are at least two differently sized such sub-shapes (e.g., L-shapes), one being larger than the next and successive one. As can be further seen in FIG. 4, the second sensing electrode 421 includes second electrode patterns 421*a* that are arranged in parallel to one another, and second connecting patterns 421*b* for interconnecting the second electrode patterns 421*a*. For example, each of the first sensing electrodes 411 includes the first electrode patterns 411*a* extending according to the first direction D1, and neighboring first electrode patterns 411*a* are electrically interconnected by the first connecting patterns 411*b* extending according to the second direction D2. Also, each of the second sensing electrodes 421 includes second electrode patterns 421*a* extending according to the first direction D1, and neighboring second electrode patterns 421*a* are electrically interconnected by second connecting patterns 421*b* extending according to the second direction D2.

The first electrode patterns 411*a* and the first connecting patterns 411*b* may be formed integrally, and, the second electrode patterns 421*a* and the second connecting patterns 421*b* may be formed integrally For example, each of the first and second sensing electrodes 411 and 412 may be formed in a serpentine shape by forming a transparent electrode, such as ITO, on an upper portion of the base film 401, and then etching (for example, wet etching) the ITO by using a photo mask Or, the each of the first and second sensing electrodes 411 and 412 may be formed by using screen printing. One exception to this is the capacitance-reducing bridging structure 422 which is best seen in FIG. 5 and will be discussed shortly.

Each of the first sensing electrodes 411 formed as such is electrically interconnected by the first bridge electrode 412, and each of the second sensing electrodes 421 is electrically interconnected by the (formed in a different layer) second bridge electrode 422. Here, the first bridge electrode 412 for interconnecting the neighboring ones of the first sensing electrodes 411 may be formed integrally with the first sensing electrode 411, but the second bridge electrode 422 for interconnecting the second sensing electrodes 421 may be formed separately (in a spaced apart layer) from the second sensing electrode 421.

Figure 5:
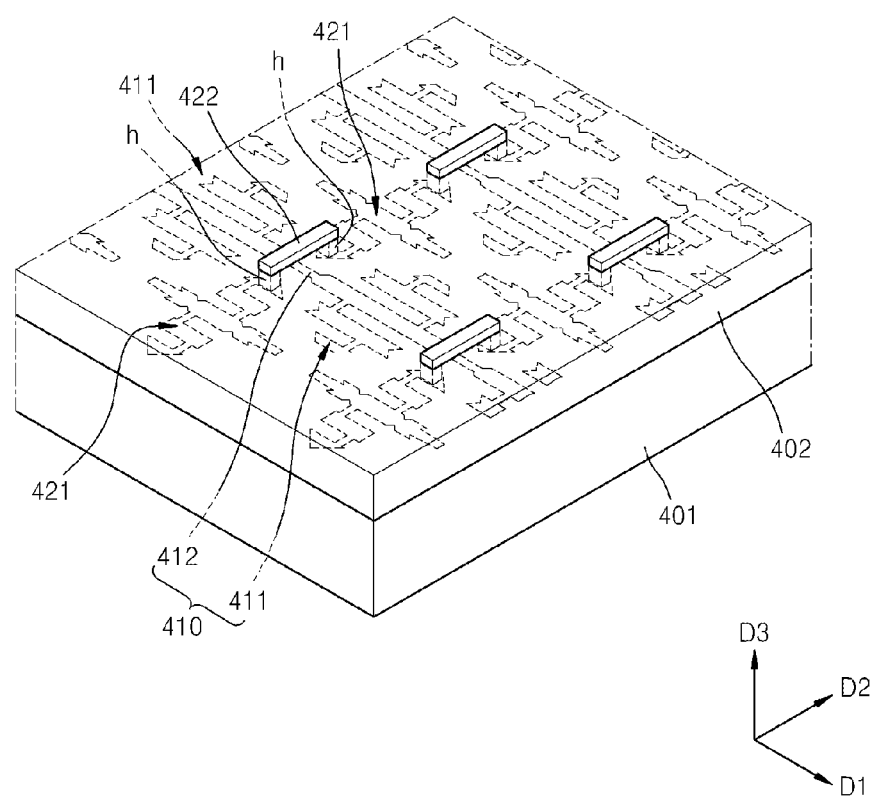
FIG. 5 is a perspective view illustrating a region of FIG. 3.

Referring to the perspective view of FIG. 5, an insulating layer 402 is formed to cover the first sensing electrodes 411 and the second sensing electrodes 421 where the latter are both monolithically integrally formed on a same major surface (e.g., an upper one in FIG. 5) of the base film 401. Then contact holes h are formed through the insulating layer 402 at locations where neighboring ones of the second sensing electrodes 421 are to be interconnected to one another. In other words, the contact holes h may be formed at predetermined locations of the insulating layer 402, for example, in positions corresponding to the second electrode patterns 421*a* that are located on an edge of the second sensing electrodes 421.

The neighboring ones of the first sensing electrodes 411 are electrically interconnected by the first bridge electrode 412 that is patterned together when the first sensing electrodes 411 are patterned. The neighboring ones of the second sensing electrodes 421 are electrically interconnected by the second bridge electrode 422 that is connected to each of the neighboring ones of the second sensing electrodes 421, the neighboring ones of the second sensing electrodes neighboring with one another via the contact holes h. For example, the second bridge electrode 422 may be formed on the insulating layer 402 by patterning a metal, such as Au, Mo, Ag, and Al, or a structure of ITO stacked on and below the metal (for example, ITO/Ag/ITO). In the case of the structure of ITO stacked on and below the metal, transmission and corrosion resistance may be enhanced.

Although the first sensing electrodes 411 and the second sensing electrodes 421 are formed on the same layer, they are electrically insulated from one another, for example such that their respective bridging structures do not short together due to the interposed presence of the insulating layer 402. The insulating layer 402 may use various dielectric materials to insulate the first sensing electrodes 411 and the second sensing electrodes 421 preferably dielectric materials of relatively low dielectric constant (e.g., less than 3). For example, the insulating layer 402 may be formed of an organic material or an inorganic material. For example, the insulating layer 402 may be formed of silicon oxide.

With this structure, the first sensing electrode 411 and the second sensing electrode 421 are formed in cross directions with respect to each other, without contacting each other, and thus, an electrical short (a short circuit) occurring between the first sensing electrode 411 and the second sensing electrode 421 may be prevented.

The touch film 400 with this structure is formed on the display device, and when an electrically conductive object like a user's finger or hand approaches or touches an outer side of the touch film 400, a point of increased capacitive intercoupling between the first and second sensing units 410/ 420 is created and touch determining circuitry (not shown) that is operatively coupled to the touch film 400 detects the change in capacitance, determines its location and outputs data indicative of the location of the approaching or touching object. More specifically, and for example, before the user's finger touches the touch film 400, the first and second sensing units 410 and 420 of the touch film 400 are capacitive intercoupled to one another by a relatively small, parasitic capacitance, and this parasitic capacitance between the two units remains constant. If the user's hand touches the touch display panel, the user's finger and the touch film 400 form an additional capacitive intercoupling at the location of the touch. The respective capacitive intercoupling between each row and each column of sensing units can be interrogated. By detecting the location in which the capacitance changes (e.g., increases), the function of the touch display panel may be achieved.

The touch panel is a flexible touch display panel, and when the touch panel includes serpentine-shaped sensing electrodes 411 and 421, as described in reference to FIGS. 3 through 5, even if the flexible touch display panel is bent in a direction, cracks or damage occurring to the sensing electrodes 411 and 421 may be prevented from spreading. More specifically, even if a crack develops due to excess stress at one point within the serpentine pattern, it is unlikely to spread to other portions due to the serpentine nature in which the different sub-areas of each sensing electrode (e.g., 411 or 412) are interconnected one to the next.

Figure 6:
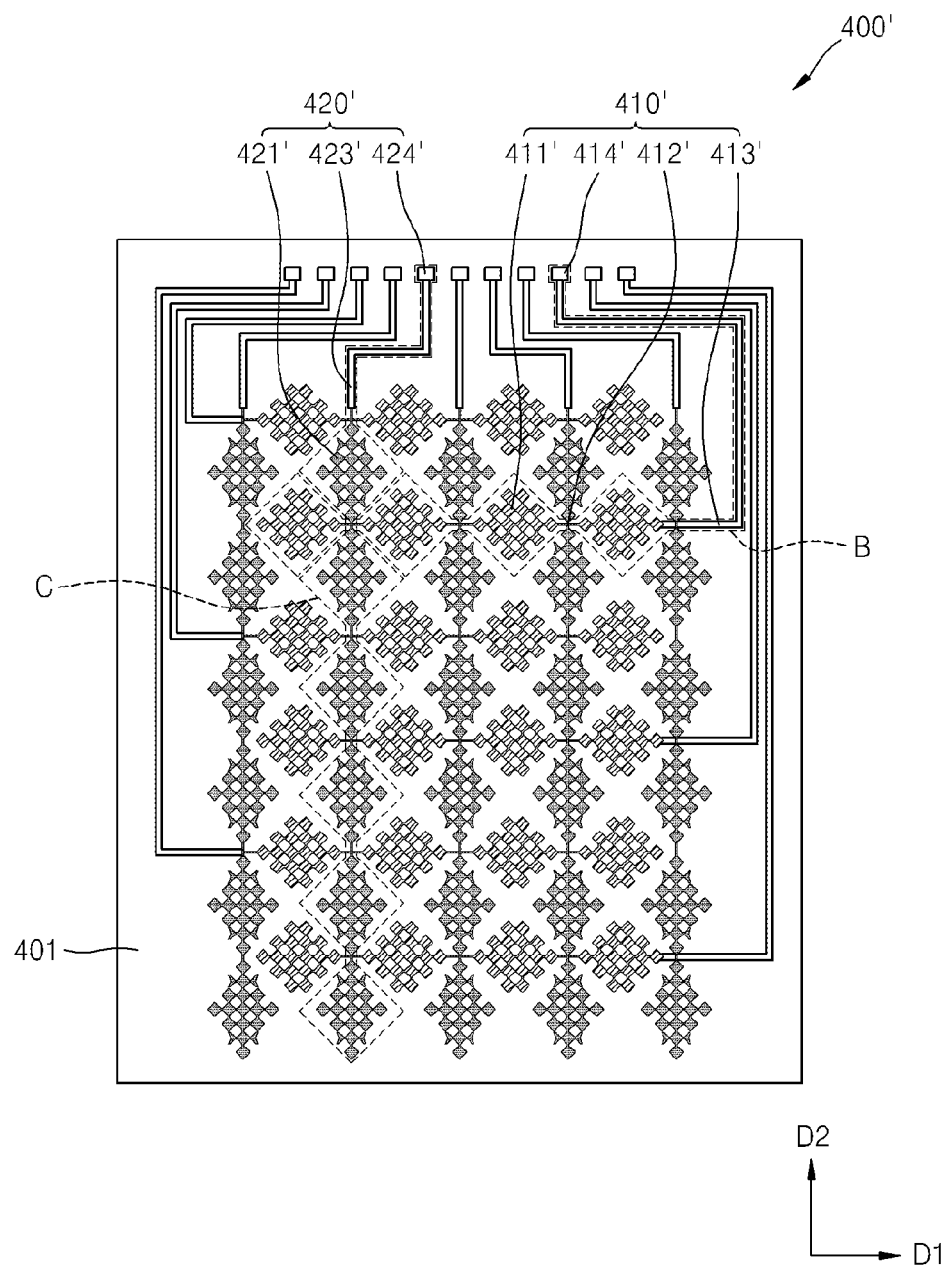
FIG. 6 is a plan view of a touch film according to another embodiment.
Figure 7:
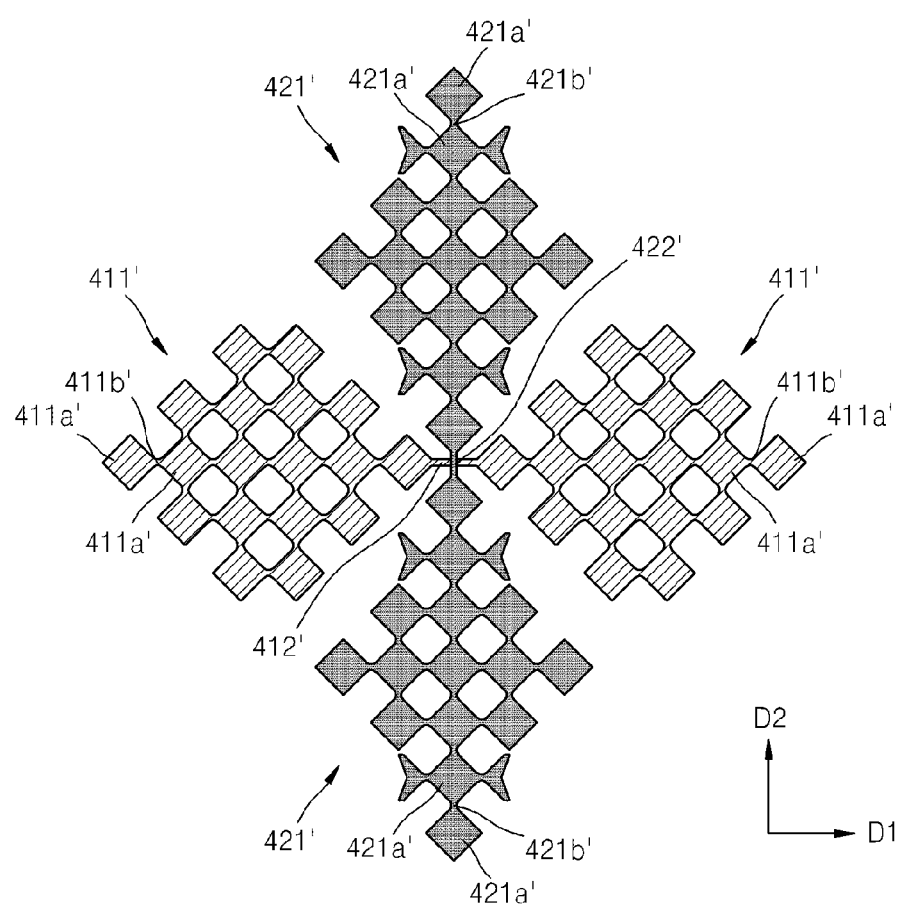
FIG. 7 is an enlarged view of a region of FIG. 6.

FIG. 6 is a top plan view of a touch film according to another embodiment in accordance with the present disclosure of invention. FIG. 7 is an enlarged view of a representative region of FIG. 6. Here, the concept of crack-spread choke points (another form of crack spread barrier creation) is explained.

Referring first to FIG. 6, the touch film 400' includes the base film 401, and the plurality of first sensing units 410' and the plurality of second sensing units 420' that are formed on the base film 401. Referring to dotted line B of FIG. 6, which indicates a representative at least one of the plurality of first sensing units 410' and is arranged in the horizontal direction D1 of FIG. 6, the at least one of the plurality of first sensing units 410' includes the plurality of first sensing electrodes 411', the plurality of first bridge electrodes 412', the first extension unit 413', and the first connecting unit 414'. Referring to dotted line C of FIG. 6, which indicates a representative at least one of the plurality of second sensing units 420' and is arranged in a vertical direction D2 of FIG. 6, the at least one of the plurality of second sensing units 420' includes the plurality of second sensing electrodes 421', the second bridge electrodes 422' interconnecting the neighboring ones of the second sensing electrodes 421', the second extension unit 423', and the second connecting unit 424'.

The first sensing electrodes 411' are arranged in a row according to the first direction D1, and the first bridge electrodes 412' interconnect the neighboring ones of the first sensing electrodes 411'. The first extension unit 413' may be formed to be gathered at the end of the base film 401, that is, the upper side of FIG. 6. At the end of the first extension unit 413', the first connecting unit 414' is formed. The second sensing electrodes 421' are arranged in columns according to the second direction D2, and the second bridge electrodes 422' interconnect the neighboring ones of the second sensing electrodes 421'. The second extension unit 423' extends according to the second direction, and thus, may be formed to be gathered at the end of the base film 401, that is, the upper side of FIG. 6. The second connecting unit 424' is formed at the end of the second extension unit 423', which is materially the same as the case of the touch film 400 that is described above in reference to FIG. 3.

Only a detailed structure of each of the sensing electrodes differing from the embodiment described in reference to FIG. 4 are described below, according to this other embodiment in accordance with the present disclosure of invention. Hereinafter, the description relating to this matter will be made based on the different aspects therebetween, for convenience of explanation.

Referring to FIG. 7, even if the flexible touch display panel is bent in various directions, and excessive strains develop such that corresponding, nascent cracks form and try to grow in a given linear direction, the nascent cracks are impeded from easily growing in length due to the incorporation crack-spread barriers in the detailed patternings of the first sensing electrode 411' and the second sensing electrode 421'. In the illustrated example, the first sensing electrode 411' and the second sensing electrode 421' are each formed to have a grid shape of openings that define crack-spread choke points (bottlenecks), this in order to prevent nascent cracks growing large and creating major open circuit conditions in the sensing units 410' and 420' of the touch film 400, and particularly, within the sensing electrodes 411' and 421'.

For example, each of the first and second sensing electrodes 411' and 412' may include the plurality of first and second electrode patterns 411a' and 421a' that are arranged in the grid shape and interconnected. Each of the first and second electrode patterns 411a' and 421a' may be interconnected by the connecting patterns 411b' and 421b' (which can serve as crack-spread choke points), with the edges of the neighboring electrode patterns 411a' and 421a' being connected. The first electrode patterns 411a' and the first connecting patterns 411b' may be formed integrally, and, the second electrode patterns 421a' and the second connecting patterns 421b' may be formed integrally (with the exception of bridge 422'). For example, the first and second sensing electrodes 411' and 421' including the electrode patterns 411a' and 421a' that are arranged in the grid shape, and the connecting patterns 411b' and 421b' for interconnecting the first and second electrode patterns 411a' and 421a', may be formed by forming a transparent electrode, such as ITO, on the upper portion of the base film 401, and then etching (for example, wet etching) the ITO by using a photo mask. Or, the first and second sensing electrodes 411' and 421' may be formed by using screen printing.

Each of the first sensing electrodes 411' formed as such is electrically interconnected by the first bridge electrode 412', and each of the second sensing electrodes 421' is electrically interconnected by the second bridge electrode 422'. Here, as described above in reference to FIG. 5, the first bridge electrode 412' for interconnecting the neighboring ones of the first sensing electrodes 411' may be formed monolithically integrally with the first sensing electrode 411', but the second bridge electrode 422' for interconnecting the second sensing electrodes 421' may be formed in a different layer such as on the insulating layer (not shown).

Although the first sensing electrodes 411' and the second sensing electrodes 421' are formed on the same layer, the first sensing electrodes 411' and the second sensing electrodes 421' are electrically insulated from shorting with one another by the insulating layer, and thus, being formed in cross directions with respect to each other, the first sensing electrodes 411' and the second sensing electrodes 421' do not contact each other. Thus, an electrical short (a short circuit) occurring between the first sensing electrodes 411' and the second sensing electrodes 421' is prevented.

The touch panel including the first and second sensing electrodes 411' and 421' according to the present embodiment is a flexible display panel, and even if the flexible touch display panel is bent in various directions, the growth of cracks or other linearly spreadable damage occurring to the sensing electrodes 411' and 421' may be prevented or substantially impeded due to the presence of crack-spread blocking boundaries and crack-spread impeding choke points (bottlenecks).

According to embodiments of the present disclosure, even if the flexible touch display panel is bent in various directions many times and some nascent cracks begin to develop, the sensing electrodes may be prevented from being substantially damaged by further growth of such nascent cracks, by including crack-spread blocking boundaries (which block linear growth of cracks) and/or crack-spread impeding choke points (bottlenecks) in the patterning of the sensing electrodes for example by forming them twisting serpentine shapes and/or forming them to have grid shapes with incorporated crack-spread impeding choke points. As a result, regardless of the bending of the flexible touch display panel many times and in random directions, it is possible to continue to reliably sense a conductive object that approaches or touches the capacitance-based flexible touch display panel as here disclosed.

As described above, according to the one or more of the above embodiments of the present disclosure of invention, the flexible touch display panel may provide a display panel including sensing electrodes that are not damaged, even if the flexible touch display panel is bent many times in various directions. Also, the flexible touch display panel may stably sense an object that approaches or touches the flexible touch display panel, regardless of the bending of the flexible touch display panel.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments in accordance with the present teachings have been described with reference to the figures, it will be understood by those of ordinary skill in the art and in light of the foregoing that various changes in form and details may be made therein without departing from the spirit and scope of the present teachings.

What is claimed is:

1. A flexible touch display panel comprising:
   a display device including a substrate, a display unit formed on the substrate, and an encapsulation film formed on the display unit to encapsulate the display unit; and
   a touch film that is arranged on the display device, including a plurality of interconnected first sensing electrodes and a plurality of interconnected second sensing electrodes that are electrically insulated from the first sensing electrodes and yet predominantly formed in a same layer as that of the plurality of first sensing electrodes,
   wherein each of the plurality of first sensing electrodes includes:
      first electrode patterns that are each independently longitudinally extending according to a certain first direction and arranged in parallel to one another; and
      first connecting patterns for connecting neighboring electrode patterns among the first electrode patterns.

2. The flexible touch display panel of claim 1,
   wherein the first connecting patterns extending according to at least one direction different from the certain first direction,
   whereby the respective extensions of the first electrode patterns and the first connecting patterns in the different directions.

3. The flexible touch display panel of claim 1, wherein the plurality of second sensing electrodes are arranged as columns extending a second direction that intersects with a first direction along which respective rows of the plurality of first sensing electrodes are formed.

4. The flexible touch display panel of claim 1, wherein the first electrode patterns and the first connecting patterns form a serpentine shape.

5. The flexible touch display panel of claim 1, wherein the plurality of first sensing electrodes and the plurality of second sensing electrodes are transparent electrodes.

6. The flexible touch display panel of claim 5, wherein the plurality of first sensing electrodes and the plurality of second sensing electrodes include at least one member selected from the group consisting of indium tin oxide (ITO), indium zinc oxide (IZO), indium oxide (IO), Ga-doped oxide (GZO), zinc oxide (ZnO), Al-doped oxide (AZO), fluorine doped tin oxide (FTO), antimony doped tin oxide (ATO), and $In_2O_3$.

7. The flexible touch display panel of claim 1, wherein each of the plurality of second sensing electrodes includes:
   second electrode patterns that are each independently extending according to a certain second direction and arranged in parallel to one another; and
   second connecting patterns for connecting neighboring electrode patterns among the second electrode patterns.

8. The flexible touch display panel of claim 7, wherein the second electrode patterns are extending according to a same direction as the first electrode patterns.

9. The flexible touch display panel of claim 7, wherein the second electrode patterns and the second connecting patterns form a serpentine shape.

10. The flexible touch display panel of claim 1, wherein:
    the touch film further includes an insulating layer formed on the plurality of first sensing electrodes and on the plurality of second sensing electrodes,
    the plurality of first sensing electrodes are electrically interconnected by respective first bridge electrodes formed in the same layers that of the first sensing electrodes, and
    the plurality of second sensing electrodes are electrically interconnected by a second bridge electrode that is arranged on the insulating layer.

11. The flexible touch display panel of claim 1, wherein the encapsulation film is a thin encapsulation film in which an organic layer and an inorganic layer are alternately stacked.

12. A flexible touch display panel comprising:
    a display device including a substrate, a display unit formed on the substrate, and an encapsulation film formed on the display unit to encapsulate the display unit; and
    a touch film that is arranged on the display device, including a plurality of first sensing electrodes that are arranged in a first direction, and a plurality of second sensing electrodes that are formed on a same layer as the plurality of first sensing electrodes and electrically insulated from the plurality of first sensing electrodes,
    wherein each of the plurality of first sensing electrodes includes a plurality of first electrode patterns that are arranged in a grid shape and interconnected.

13. The flexible touch display panel of claim 12, wherein the plurality of second sensing electrodes are arranged in a second direction that intersects the direction in which the plurality of first sensing electrodes are arranged.

14. The flexible touch display panel of claim 12, wherein the first electrode patterns are interconnected, by first connecting patterns, with edges of neighboring electrode patterns that are among the first connecting patterns and connected to one another.

15. The flexible touch display panel of claim 12, wherein the plurality of first sensing electrodes and the plurality of second sensing electrodes are transparent electrodes.

16. The flexible touch display panel of claim 15, wherein the plurality of first sensing electrodes and the plurality of second sensing electrodes include any one selected from the group consisting of indium tin oxide (ITO), indium zinc oxide (IZO), indium oxide (IO), Ga-doped oxide (GZO), zinc oxide (ZnO), Al-doped oxide (AZO), fluorine doped tin oxide (FTO), antimony doped tin oxide (ATO), and $In_2O_3$.

17. The flexible touch display panel of claim 12, wherein each of the plurality of second sensing electrodes includes a plurality of second electrode patterns that are arranged in a grid shape and interconnected.

18. The flexible touch display panel of claim 17, wherein the second electrode patterns are interconnected, by second connecting patterns, with edges of neighboring electrode patterns that are among the second connecting patterns and connected to one another.

19. The flexible touch display panel of claim 12, wherein the touch film further includes an insulating layer formed on the plurality of first sensing electrodes and the plurality of second sensing electrodes, and the plurality of first sensing electrodes are electrically interconnected by a first bridge electrode, and the plurality of second sensing electrodes are electrically interconnected by a second bridge electrode that is arranged on the insulating layer.

20. The flexible touch display panel of claim 12, wherein the encapsulation film is a thin encapsulation film in which an organic layer and an inorganic layer are alternately stacked.

* * * * *